United States Patent [19]
Takahashi et al.

[11] Patent Number: 5,261,356
[45] Date of Patent: Nov. 16, 1993

[54] OUTBOARD MOTOR

[75] Inventors: Masanori Takahashi; Masahiko Katoh, both of Hamamatsu, Japan

[73] Assignee: Sanshin Kogyo Kabushiki Kaisha, Hamamatsu, Japan

[21] Appl. No.: 958,237

[22] Filed: Oct. 8, 1992

[30] Foreign Application Priority Data

Nov. 16, 1991 [JP] Japan .................. 3-328059

[51] Int. Cl.⁵ .................................. F01P 1/06
[52] U.S. Cl. ...................... 123/41.31; 123/563; 60/599; 440/88
[58] Field of Search ............. 123/41.31, 559.1, 563; 60/598, 599; 440/88

[56] References Cited

U.S. PATENT DOCUMENTS

| 4,068,612 | 1/1978 | Meiners | 60/605.1 |
| 4,608,827 | 9/1986 | Hasegawa et al. | 123/41.31 |
| 4,955,352 | 9/1990 | Takeda | 123/559.1 |

FOREIGN PATENT DOCUMENTS

| 570533 | 5/1924 | France | 123/563 |
| 3-68521 | 5/1991 | Japan . | |

Primary Examiner—Noah P. Kamen
Attorney, Agent, or Firm—Ernest A. Beutler

[57] ABSTRACT

A supercharged outboard motor including a water cooling jacket that encircles the supercharger and also the duct which interconnects the supercharger with the engine for cooling of the supercharger and compressed air charge without necessitating a separate intercooler.

8 Claims, 4 Drawing Sheets

OUTBOARD MOTOR

BACKGROUND OF THE INVENTION

This invention relates to an outboard motor and more particularly to a supercharger arrangement for an internal combustion engine and a cooling arrangement for the compressed air charge.

The use of superchargers to improve the performance of internal combustion engines are well known. By using a supercharger, the air delivered to the engine for its combustion is compressed so as to force a greater fuel/air charge into the combustion chamber and permit the attainment of a higher power output than atmospherically charged engines. In addition, if the engine is of the two-cycle type, the use of a supercharger can assist and improved in the scavenging action.

Because of the fact that the air charge compressed by the supercharger becomes heated, the full advantages of supercharging may not be enjoyed. That is, as the air charge is heated, the air expands and the density of the air delivered to the combustion chamber is reduced. To avoid this, it has been proposed to incorporate intercoolers that cool the air charge before it is delivered to the engine so as to improve the volumetric efficiency and further gain the advantages of supercharging.

However, there are a number of disadvantages to the use of intercoolers, particularly with certain engine applications For example, the intercooler takes up a fairly substantial amount of space in and of itself and this can render it unsuited for certain applications. For example, if the engine is a part of an outboard motor, the compact nature of the outboard motor makes it difficult to provide an effective intercooler. Furthermore, the positioning of the intercooler may interfere with the serviceability of certain components. In addition, the intercooler acts between the supercharger and the engine and the actual heat generation takes place for the most part, within the body of the supercharger itself.

It is, therefore, a principal object to this invention to provide an improved arrangement for cooling a supercharger for an internal combustion engine.

It is a further object to this invention to provide a supercharged, outboard motor wherein the supercharger has a high efficiency because it is itself cooled.

It is a further object to this invention to provide an improved supercharging arrangement for an internal combustion engine wherein the supercharger and the ducting interconnecting the supercharger with the engine are both cooled.

SUMMARY OF THE INVENTION

This invention is adapted to be embodied in an internal combustion engine having a combustion chamber and a supercharger for delivering a pressurized air charge to the combustion chamber. In accordance with the invention, means are provided for cooling the body of the supercharger.

DETAILED DESCRIPTION OF THE PREFERRED EMBODIMENT OF THE INVENTION

Figure 1:
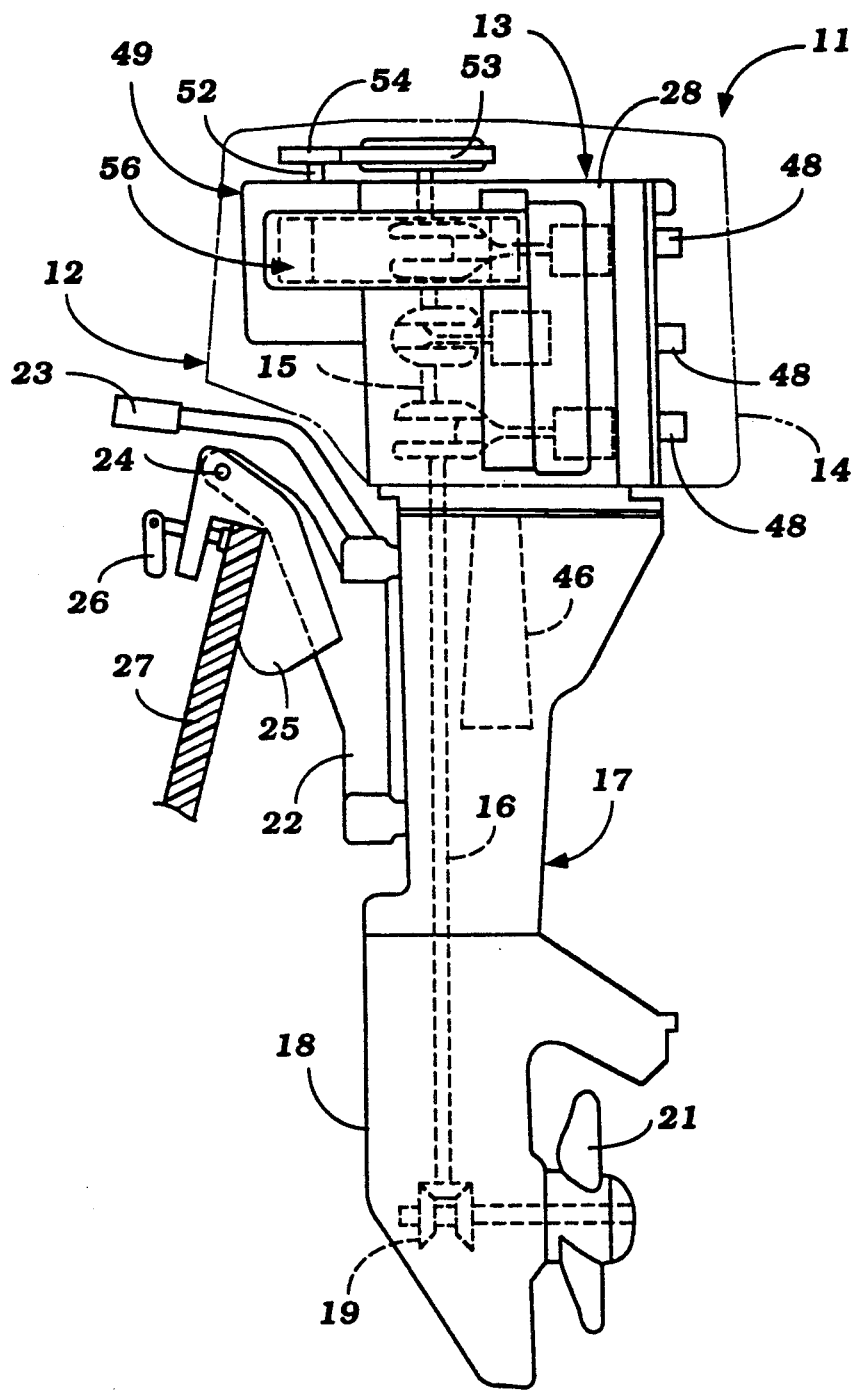
FIG. 1 is a side elevational view of an outboard motor constructed in accordance with an embodiment of the invention, with a portion of the outboard motor being shown in phantom.
Figure 2:
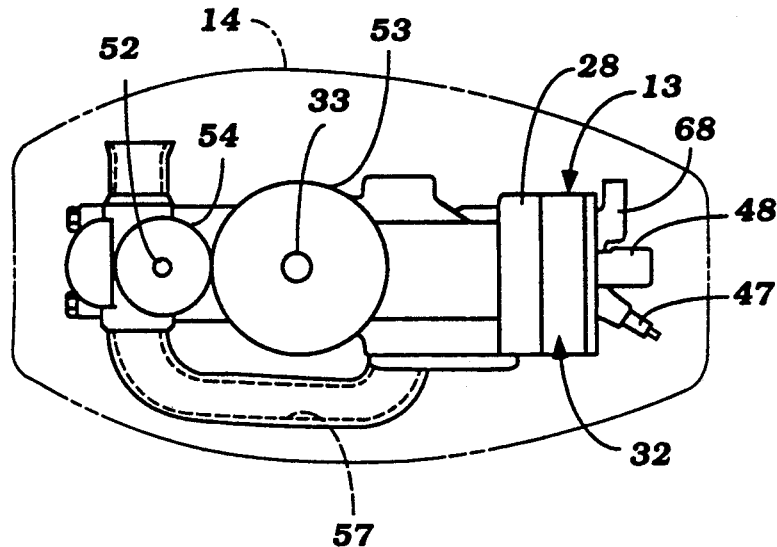
FIG. 2 is a top plan view of the outboard motor with the protective cowling shown in phantom.
Figure 3:
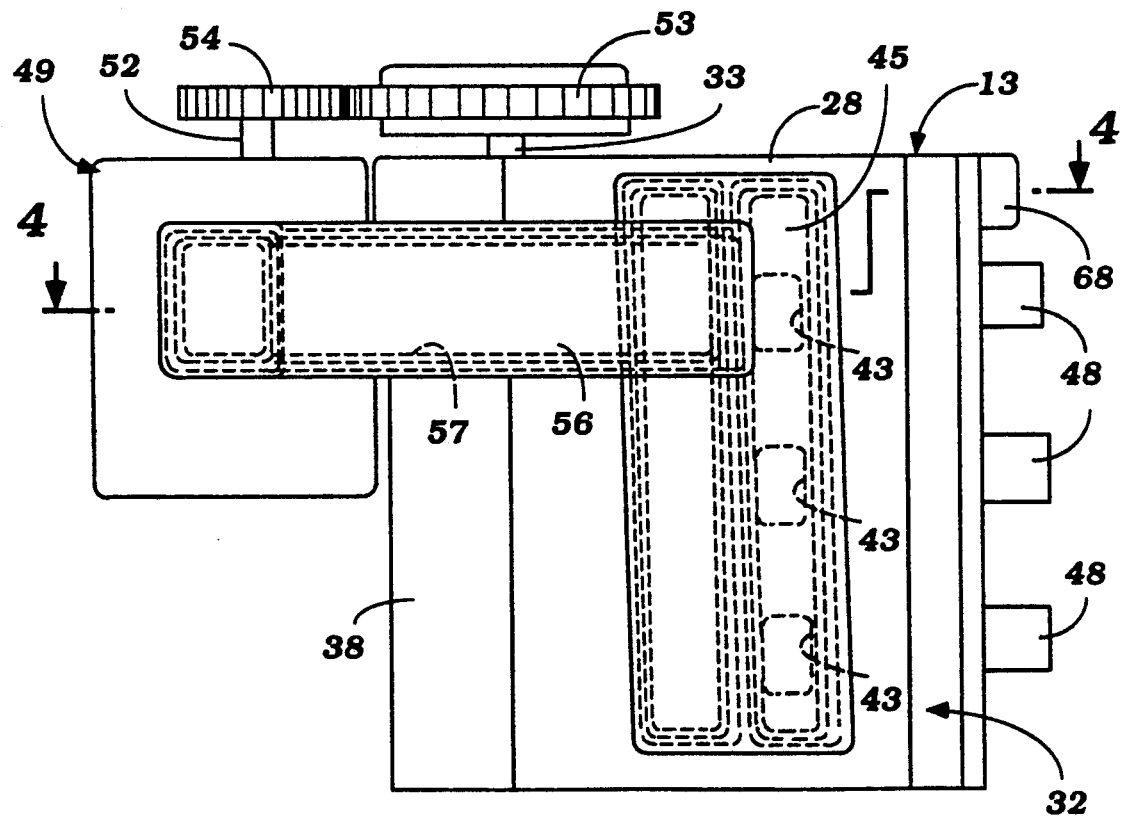
FIG. 3 is an enlarged side elevational view of the engine of the outboard motor.
Figure 4:
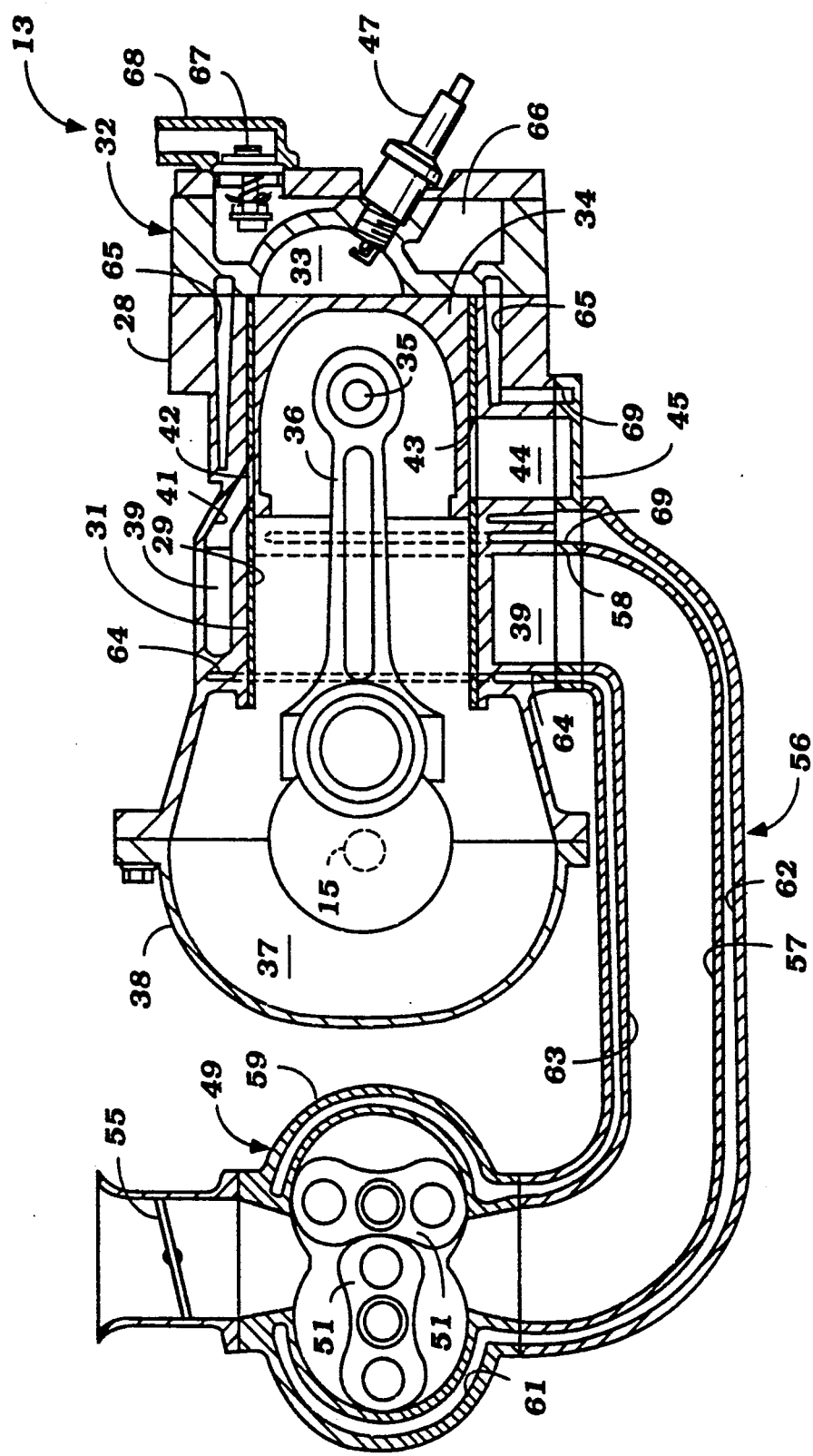
FIG. 4 is a cross sectional view taken along the line 4—4 of FIG. 3.

Referring now in detail to the drawings and initially to FIG. 1, an outboard motor constructed in accordance with an embodiment of the invention is identified generally by the reference numeral 11. The invention is described in conjunction with an outboard motor because of the fact that such outboard motors normally are powered internal combustion engines operating on a two-cycle principal and the invention has particularly utility in conjunction with such two-cycle engines. It addition, outboard motors provide a problem in that they must be extremely compact in nature and the invention provides a compact supercharging arrangement for an internal combustion engine. It is to be understood, however, that the invention may be employed with other applications for internal combustion engines and other types of engines than two-cycle engines.

The outboard motor 11 includes a power head, indicated generally by the reference numeral 12 which is comprised of a powering internal combustion engine 13 and a surrounding protective cowling, shown in phantom and identified by the reference numeral 14. As is typical with outboard motor practice, the engine 13 is supported so that its output shaft 15 rotates about a vertically extending axis. The output shaft 15 is coupled to a drive shaft 16 which is journalled in a drive shaft housing 17 and which also rotates about a vertically extending axis. The drive shaft 16 depends into a lower unit 18 in which a forward, neutral, reverse transmission 19 of the bevel gear type is provided for driving a propeller 21 in selected forward and reverse directions.

A steering shaft (now shown) is affixed to the drive shaft housing 17 and is journalled for steering movement about a generally vertically extending steering axis within a swivel bracket 22. A tiller 23 is affixed to the upper end of this steering shaft for steering of the outboard motor 11 in a well known manner.

A pivot pin 24 pivotally connects the swivel bracket 2 to a clamping bracket 25 for permitting tilt and trim movement of the outboard motor 11 as is well known in this art. A clamp 26 is carried by the clamping bracket 25 and affords a detachable connection to a transom 27 (shown partially in cross section) of an associated watercraft.

Referring now additionally to the remaining figures, the engine 13 is, in the illustrated embodiment, of the three cylinder, in-line, reciprocating type. It is to be understood, however, that certain facets of the invention may be employed with engines having other cylinder numbers and other cylinder types or, in fact, engines which are other than reciprocating engines.

The engine 13 includes a cylinder block 28 in which three aligned cylinder bores 29 are formed by pressed or cast-in cylinder liners 31. A cylinder head assembly 32 is affixed to the cylinder block 28 in an appropriate manner and has a recess 33 which cooperates with each of the cylinder bores 29 to form in part the combustion chambers of the engine.

Pistons 34 are supported for reciprocation within each cylinder bore 29 and are connected by means of piston pins 35 to the small end of a respective connecting rod 36. The big end of each connecting rod 36 is connected to a respective throw of the crankshaft 15. The crankshaft 15 is supported for rotation within a crankcase chamber 37 formed by a skirt of a cylinder block 28 and a crankcase member 38 that is affixed to the cylinder block 28 in any appropriate manner.

A plenum chamber 39 is formed in the lower portion of the cylinder block 28 and encircles the lower portion of each of the cylinder liners 31. This plenum chamber 39 communicates with a plurality of scavenge passages 41 (only one of which appears in the figures) which extend to and terminate at scavenge ports 42 formed circumferentially around the cylinder bores 29. These scavenge ports 42 are opened and closed by the reciprocation of the pistons 34, as is well known. Preferably the positioning and location of the scavenge passages 41 and scavenge ports 42 are such so as to provide a Schnurle type scavenging within the combustion chamber of the engine.

An exhaust port 43 is also formed in the cylinder liner 31 and communicates with an exhaust manifold 44 formed integrally within the cylinder block 28 and closed in part by means of a cover plate 45 which is affixed to one side of the cylinder block 28 in an appropriate manner. The exhaust manifold 44 communicates with an exhaust pipe 46 (FIG. 1) which extends into the drive shaft housing 17 and delivers the exhaust gases to an expansion chamber formed therein. The exhaust gases then exit through an underwater exhaust gas outlet, such a through-the-hull propeller exhaust. In addition, a restricted above-the-water exhaust discharge (not shown) may be provided for exhausting the gases above the water level when the watercraft is traveling at a low speed and the propeller 21 is relatively deeply submerged.

Spark plugs 47 are mounted in the cylinder head assembly 32 for firing the charge at an appropriate time. In accordance with the illustrated embodiment, the engine 13 is supplied with fuel by fuel injectors 48 that are mounted in the cylinder head assembly 32 and which inject directly into the recesses 33. If desired, the injectors 48 may be fuel/air injectors so as to inject air under high pressure as well as fuel.

A system is provided for delivering a compressed air charge to the plenum chamber 39 and this includes an engine driven supercharger 49 which, in the illustrated embodiment, is of the Roots type including a pair of intermeshing rotors 51. The rotors 51 are driven by a drive shaft 52 which, in turn, is driven from the crankshaft 33 by means of a pair of intermeshing spur gears 53 and 54 affixed to the crankshaft 33 and drive shaft 52, respectively. An appropriate gear ratio is chosen so that the rotors 51 will be driven at the desired speed. An air charge is drawn from an atmospheric inlet in which a throttle valve 55 of the butterfly type is provided so as to control the speed of the engine 13.

The supercharger 49 outputs its pressure to a manifold 56 having a manifold passageway 57 that delivers the compressed air charge to an opening 58 formed in the plate 45 and which communicates directly with the plenum chamber 39.

As is well known, the action of the supercharger 49 will heat the air charge which is pressurized and this will tend to reduce the volumetric efficiency of the system due to the expansion of the heated air. In accordance with the invention, the supercharger 49 and specifically its outer housing 59 is formed with a cooling jacket 61. In a like manner, the manifold 56 is formed with a two part cooling jacket consisting of an inlet portion 62 and a discharge portion 63 formed on diametrically opposite sides of the manifold 56 but which are sealed from each other.

The engine 13 is also provided with a cooling jacket which is comprised of a plenum chamber cooling jacket portion 64 which is formed in the cylinder block 28 on opposite sides of the plenum chamber 39 for cooling it. In addition, the upper portion of the cylinder block 28 is formed with a cooling jacket 65 and the cylinder head assembly 32 is formed with a cylinder head cooling jacket 66. The cylinder block cooling jacket 65 and the cylinder head cooling jacket 66 are in communication with each other. In addition, a thermostatic valve 67 is mounted within a housing 68 on the cylinder head for return of coolant in a flow path as will be described.

Figure 5:
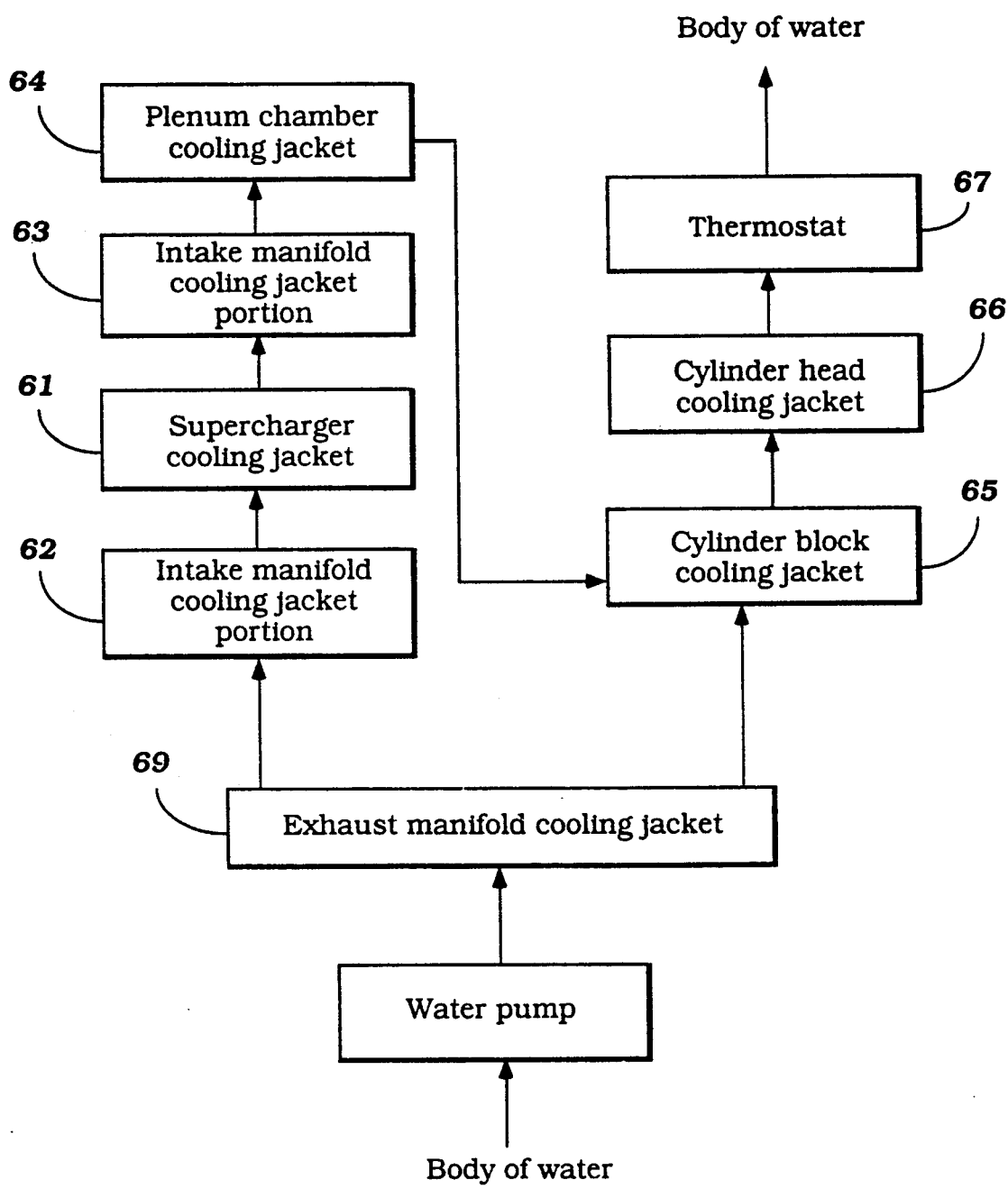
FIG. 5 is a schematic view showing the flow of liquid coolant through the engine.

An exhaust manifold cooling jacket 69 is formed around the exhaust manifold 44 and is formed in part in the plate 45. A water pump (not shown) is mounted at the interface between the drive shaft housing 17 and the lower unit 18 and is driven by the drive shaft 16 in a manner well known in outboard motor practice. This water pump draws water from the body of water in which the watercraft is operating through an opening in the lower unit 18 through the path shown in FIG. 5. Initially the water pump delivers the water to the exhaust manifold cooling jacket 69.

From this point, the water branches into two paths, a first path which extends to the manifold inlet portion 62 and which causes a portion of the cooling water to flow along one side of the manifold passage 57 and to the cooling jacket 61 of the supercharger 49. Hence, relatively low temperature water will be circulated around the supercharger 49 so as to effectively cool it. This water then flows back through the return path 63 of the manifold 56 and enters the plenum chamber cooling jacket 64 of the cylinder block 28. This water is then returned to the cylinder block cooling jacket 65 for flow through it and the cylinder head cooling jacket 66 and discharged backed through the thermostat 67 when it is opened back into the body of water in which the watercraft is operating through a suitable return path. This normally includes mixing of this cooling water with the exhaust gases in the expansion chamber of the drive shaft housing 17.

The other flow path of the fresh water introduced to the manifold cooling jacket 69 flows directly into the cylinder block cooling jacket 65 and then cylinder head cooling jacket 66 for return back to the body of water in which the watercraft is operating through the aforedescribed path.

As a result of this construction, it should be readily apparent that the cooling water delivered to the engine 13 is divided so that a portion of it will cool the induction system and particularly the supercharger 49 and manifold 56 so as to insure good volumetric efficiency without overheating the engine itself. The remainder of the cooling water flows primarily through the engine for its cooling while the manifold and supercharger cooling water is also mixed with this water before returned to the body of water in which the watercraft is operating. As a result, there is good manifold cooling and separate inner coolers are not required. This permits a very compact construction as should be readily apparent.

It is to be understood that the foregoing description is that of a preferred embodiment of the invention and various changes and modifications may be made without departing from the spirit and scope of the invention, as defined by the appended claims.

What is claimed is:

1. An internal combustion engine having a combustion chamber and a cooling jacket, a supercharger for delivering a compressed air charge to said combustion chamber and having a cooling jacket, and means for circulating liquid coolant from the same source to the supercharger cooling jacket and the engine cooling jacket in a parallel flow pattern.

2. An internal combustion engine as set forth in claim 1 wherein a duct interconnects the supercharger with the engine combustion chamber and wherein the duct is formed with a cooling jacket through which liquid coolant is circulated and wherein the liquid coolant delivered to the supercharger flows through the duct cooling jacket before the supercharger cooling jacket.

3. An internal combustion engine as set forth in claim 1 wherein the liquid coolant flowing through the supercharger cooling jacket is returned through the engine cooling jacket.

4. An internal combustion engine as set forth in claim 3 wherein a duct interconnects the supercharger with the engine combustion chamber and wherein the duct is formed with a cooling jacket through which liquid coolant is circulated and wherein liquid coolant delivered to the supercharger flows through the duct cooling jacket before the supercharger cooling jacket.

5. An internal combustion engine having a combustion chamber, a supercharger having a pumping chamber containing pumping for delivering a compressed air charge to said combustion chamber, means defining a cooling jacket extending around said pumping chamber for cooling said supercharger and the charge compressed by said supercharger, a cooling jacket for cooling said engine and means for pumping liquid coolant from the same source to said supercharger cooling jacket and said engine cooling jacket in a parallel flow pattern, said engine being the powering device for an outboard motor and being contained in a power head of the outboard motor.

6. An internal combustion engine as set forth in claim 5 wherein a duct interconnects the supercharger with the engine combustion chamber and wherein the duct is formed with a cooling jacket through which liquid coolant is circulated and wherein liquid coolant delivered to the supercharger flows through the duct cooling jacket before the supercharger cooling jacket.

7. An internal combustion engine as set forth in claim 5 wherein the liquid coolant flowing through the supercharger cooling jacket is returned through the engine cooling jacket.

8. An internal combustion engine as set forth in claim 7 wherein a duct interconnects the supercharger with the engine combustion chamber and wherein the duct is formed with a cooling jacket through which liquid coolant is circulated and wherein liquid coolant delivered to the supercharger flows through the duct cooling jacket before the supercharger cooling jacket.

* * * * *